US008089362B2

(12) United States Patent  
Chamandy et al.

(10) Patent No.: US 8,089,362 B2  
(45) Date of Patent: Jan. 3, 2012

(54) MERCHANDISE SECURITY KIT

(75) Inventors: Paul A. Chamandy, Ithaca, NY (US); Rudolph J. Klein, Centerville, OH (US); Ian James Forster, Chelmsford (GB)

(73) Assignee: Avery Dennison Corporation, Pasadena, CA (US)

(*) Notice: Subject to any disclaimer, the term of this patent is extended or adjusted under 35 U.S.C. 154(b) by 409 days.

(21) Appl. No.: 12/420,095

(22) Filed: Apr. 8, 2009

(65) Prior Publication Data

US 2010/0259392 A1 Oct. 14, 2010

(51) Int. Cl.  
G08B 13/14 (2006.01)

(52) U.S. Cl. ........... 340/572.8; 340/572.1; 340/572.4

(58) Field of Classification Search ........... 340/572.8, 340/572.1, 572.4, 572.5  
See application file for complete search history.

(56) References Cited

U.S. PATENT DOCUMENTS

| | | | |
|---|---|---|---|
| 3,942,829 A | 3/1976 | Humble et al. | |
| 4,356,477 A | 10/1982 | Vandebult | |
| 4,429,302 A | 1/1984 | Vandebult | |
| 4,510,489 A | 4/1985 | Anderson, III et al. | |
| 4,510,490 A | 4/1985 | Anderson, III et al. | |
| 4,686,516 A | 8/1987 | Humphrey | |
| 4,694,283 A | 9/1987 | Reeb | |
| 4,797,658 A | 1/1989 | Humphrey | |
| 5,077,872 A | 1/1992 | Guthammar | |
| 5,426,419 A | 6/1995 | Nguyen et al. | |
| 5,942,978 A | 8/1999 | Shafer | |
| 5,955,951 A | 9/1999 | Wischerop et al. | |
| 7,023,348 B2* | 4/2006 | Hogan et al. | 340/572.8 |
| 7,183,917 B2 | 2/2007 | Piccoli et al. | |
| 7,190,272 B2 | 3/2007 | Yang et al. | |
| 7,215,250 B2 | 5/2007 | Hansen et al. | |
| 7,474,222 B2* | 1/2009 | Yang et al. | 340/572.8 |
| 7,724,146 B2* | 5/2010 | Nguyen et al. | 340/572.8 |
| 2004/0233042 A1 | 11/2004 | Piccoli et al. | |
| 2006/0097872 A1 | 5/2006 | Ho | |
| 2008/0303675 A1* | 12/2008 | Hogan et al. | 340/572.8 |

FOREIGN PATENT DOCUMENTS

WO 0004518 1/2000  
(Continued)

OTHER PUBLICATIONS

Invitation to Pay Additional Fees issued in corresponding International application PCT/US2010/029290 dated Aug. 3, 2010.

(Continued)

*Primary Examiner* — Hung T. Nguyen  
(74) *Attorney, Agent, or Firm* — Avery Dennison Corporation

(57) ABSTRACT

A merchandise security kit includes a tag body, a first tack adapted to be removably attached to the tag body to form a first reusable hard tag that is limited to electronic article surveillance (EAS) capabilities, and a second tack adapted to be removably attached to the tag body to form a second reusable hard tag that is provided with both EAS and radio frequency identification (RFID) capabilities. The tag body comprises a security inlay that is disposed within a protective casing, the security inlay including an antenna and an EAS marker. The second tack comprises an enlarged head, a sharpened pin connected to the head and an integrated circuit (IC) chip embedded within the head. With the second tack attached to the tag body, the IC chip either conductively or reactively couples to the antenna in the tag body to provide the second hard tag with its RFID capabilities.

24 Claims, 11 Drawing Sheets

FOREIGN PATENT DOCUMENTS

| | | |
|---|---|---|
| WO | 2006050407 | 5/2006 |
| WO | 2008069643 | 6/2008 |

OTHER PUBLICATIONS

Response to Invitation to Pay Additional Fees filed in corresponding International application PCT/US2010/029290 on Sep. 2, 2010.

International search report and written opinion issued in corresponding International application PCT/US2010/029290 dated Oct. 4, 2010.

Response to International search report and written opinion filed in corresponding International application PCT/US2010/029290 on Dec. 3, 2010.

* cited by examiner

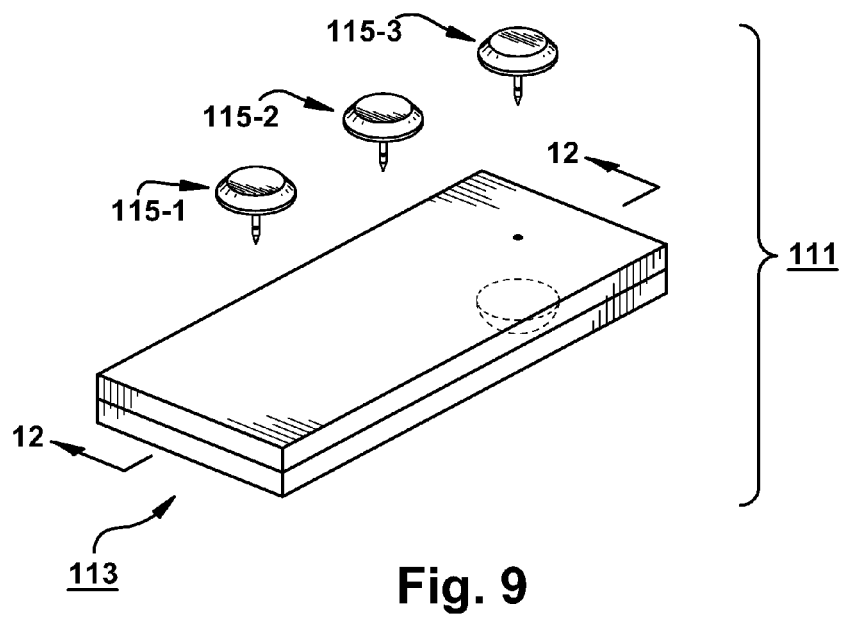
Fig. 9
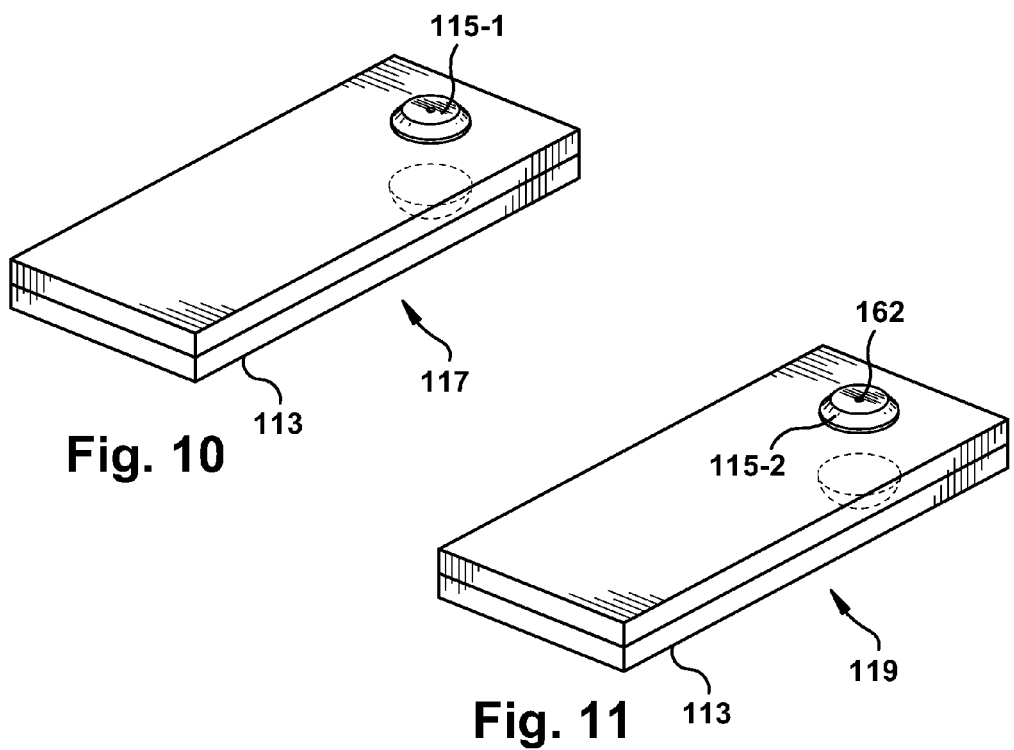
Fig. 10
Fig. 11

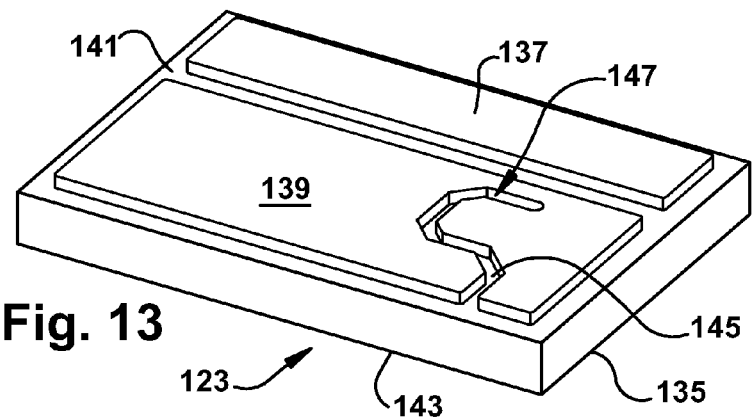
Fig. 13
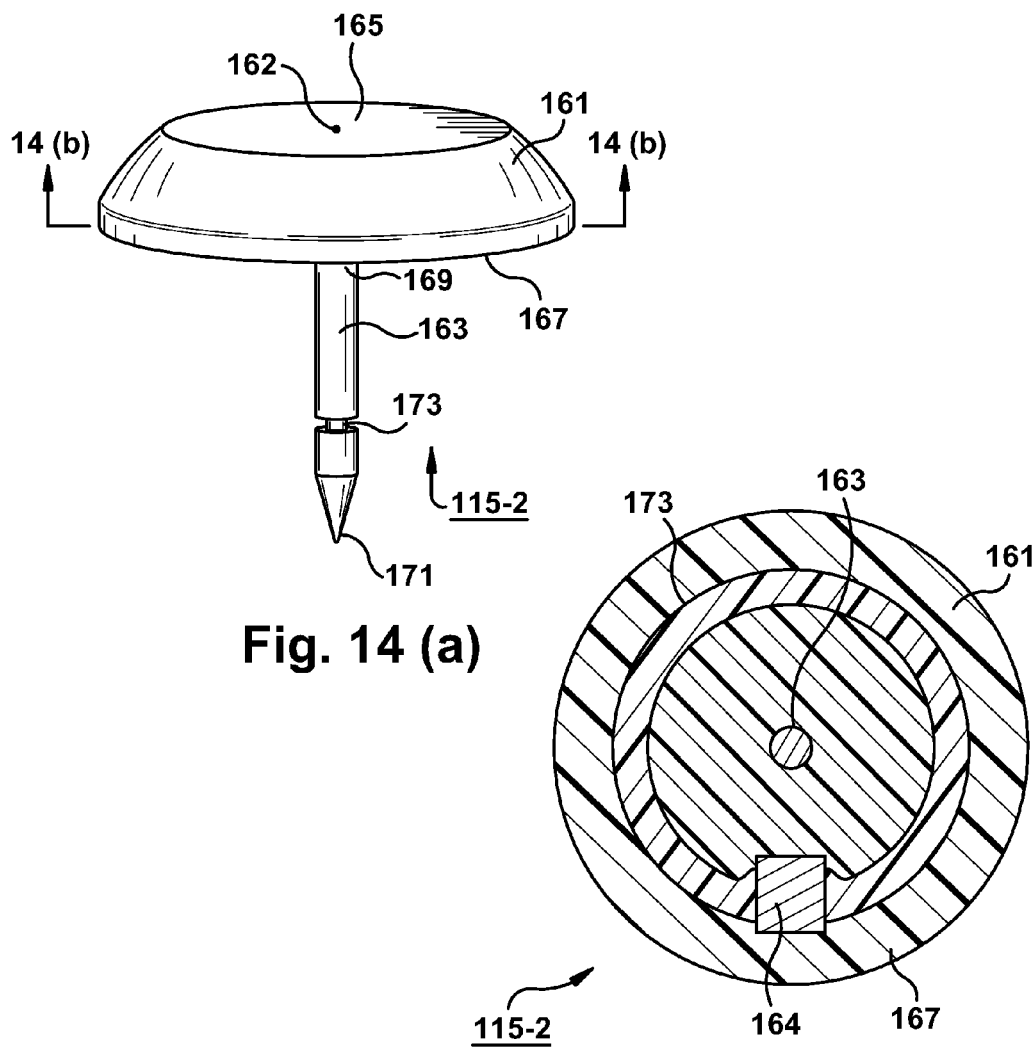
Fig. 14 (a)
Fig. 14 (b)

MERCHANDISE SECURITY KIT

BACKGROUND OF THE INVENTION

The present invention relates generally to the retail industry and relates more particularly to merchandise security devices used in the retail industry.

The prevention and deterrence of merchandise theft has been the subject of numerous technical approaches. One type of approach has been to attach to an article of merchandise a security device in the form of an electronic article surveillance (EAS) tag or device, the EAS device being adapted to trigger an alarm or the like if the article is moved beyond a predetermined location and the EAS device has not been deactivated or removed from the article. In the aforementioned type of approach, a transmitting apparatus and a receiving apparatus are typically situated on opposite sides of a passageway leading to an exit of the premises being protected, the transmitting apparatus and the receiving apparatus together defining an interrogation zone. The transmitting apparatus is typically used to transmit over the interrogation zone an interrogation signal that is recognizable by the EAS device and that causes the EAS device, if not deactivated, to emit a response signal. The receiving apparatus is typically used to detect the presence of a response signal from an activated EAS device located within the interrogation zone. The detection by the receiving apparatus of a response signal indicates that the EAS device has not been removed or deactivated and that the article bearing the EAS device may not have been paid for or properly checked out. Typically, the detection of such a response signal by the receiving apparatus triggers an alarm.

One common type of EAS device is referred to in the art as "a hard tag" and is typically used to protect articles of clothing and similar items. Typically, a hard tag comprises a tag body and a removable tack. The tag body is typically made of rigid plastic and houses an EAS sensor. The tack has a sharp end that is adapted to pierce the article being protected and then is adapted to be inserted into the interior of the tag body. A mechanism, which may include a magnetic or mechanical clamp, is typically housed within the tag body and is used to retain the sharp end of the tack within the tag body, thereby preventing the hard tag from being removed from the article. After the article has been purchased, a detaching device is typically used to release the tack from the clamping mechanism, thereby permitting the tack to be removed from the tag body and, in turn, the hard tag to be removed from the article.

One example of a hard tag is disclosed in U.S. Pat. No. 5,426,419, inventors Nguyen et al., which issued Jun. 20, 1995, and which is incorporated herein by reference. The hard tag of the aforementioned patent comprises a tag body and a tack, the tack being completely physically separable from the tag body. The tag body comprises an upper housing member and a lower housing member, the upper and lower housing members being joined together by welding or the like and jointly defining a front cavity and a rear cavity. A front opening is provided in the tag body, and interior walls and the sides of the housing members define an arcuate channel leading from the front opening to the front cavity. An EAS sensor is disposed within the rear cavity of the tag body. The tack includes an enlarged tack head and an elongated tack body, the tack body extending from the tack head. The end of the tack body opposite the tack head is pointed for insertion through an article of clothing or the like. A small opening is provided in the upper housing member, the pointed end of the tack body being insertable through said small opening and into a receiving collar disposed within the front cavity of the tag body until the tack head is seated upon the upper housing member. In this manner, by inserting the pointed end of the tack body through an article and then through the small opening in the upper housing member and into the receiving collar, the article is trapped between the tack head and the upper housing member of the tag body. A spring clamp is disposed within the front cavity of the tag body for preventing the tack body from being withdrawn from the tag body, the spring clamp being shaped to include a clamp body and a pair of jaws. The pair of jaws is adapted to grip the tack body and prevent its release from the tag body. To release the tack body from the clamp, an arcuate probe is inserted through the front opening and the arcuate channel and is used to pivot the clamp body until the jaws are moved away from the tack body. The tack may then be removed from the tag body, thereby permitting the tag to be removed from the article. Other tack releasing mechanisms can be used, as are common in the EAS hard tag product line. Particularly, a low cost magnetic release mechanism is common.

Due to their relatively inexpensive nature, electronic article surveillance tags of the type described in detail above have achieved widespread use in the retail industry to prevent the theft or otherwise unauthorized removal of articles from a controlled area.

To enhance their functionality, EAS tags are occasionally equipped with a radio frequency identification (RFID) device. As a result, hard tags with RFID capabilities can be used not only in security applications but also to store pertinent data relating to the article to which it is attached (e.g., a unique identification code and/or visually perceptive information relating to the article, such as manufacturer, size, shape, style and/or color) as well as any data relating to the shipping containers and pallets which house the individual articles. As can be appreciated, the use of radio frequency identification technology in the retail industry introduces a number of notable advantages including, but not limited to, (i) the elimination of the need for a direct line of sight during the automatic exchange of data (which is presently required in bar code systems), (ii) the ability to exchange a large quantity of data within a relatively short period of time, thereby affording a retailer with greater product control, greater efficiency in managing inventory and greater effectiveness in tracking a product, and (iii) the ability to extract data in a fully automated fashion, thereby reducing labor costs and increasing data accuracy.

An RFID device, such as a label or tag, often comprises an RFID inlay that is secured to the underside of a printable face sheet (or facestock) by means of a layer of pressure sensitive adhesive. The RFID inlay commonly includes a substrate, an antenna disposed on one surface of substrate and an RFID integrated circuit (IC) chip coupled to the antenna. It is to be understood that the IC chip is designed to both store pertinent data relating to the article and, when induced, generate a radio frequency signal relating to said data which is in turn propagated by the antenna.

RFID devices include active tags and labels, which include a power source, and passive tags and labels, which do not. In the case of passive devices, in order to retrieve the information from the chip, a "base station" or "reader" sends an excitation signal to the RFID tag or label. The excitation signal energizes the tag or label, and the RFID circuitry transmits the stored information back to the reader. The RFID reader receives and decodes the information from the RFID tag. In general, RFID tags can retain and transmit enough information to uniquely identify individual items, packages, inventory and the like. RFID tags and labels also can be characterized as to those to which information is written only once (although the information may be read repeatedly), and those to which information may be written during use. For example, RFID tags may store environmental data (that may be detected by an associated sensor), logistical histories, state data, etc.

Hard tags that are equipped with both electronic article surveillance (EAS) and radio frequency identification (RFID) devices are commonly referred to in the art simply as "combination hard tags". Examples of combination hard tags include U.S. Pat. No. 7,183,917 to A. Piccoli et al., U.S. Pat. No. 5,955,951 to J. Wischerop et al., and U.S. Pat. No. 5,942,978 to G. Shafer, all of said patents being incorporated herein by reference.

Combination hard tags of the type referenced above have been found to suffer from a notable shortcoming. Specifically, many participants in the retail supply chain are not in possession of the necessary equipment to read and/or program the IC chip for an RFID device. As a result, these participants are largely unwilling to pay for a combination hard tag that is considerably more expensive than a conventional EAS hard tag (due to the substantial cost associated with the IC chip in an RFID device). For this reason, the integration of combination hard tags into the retail landscape has been met with significant resistance.

SUMMARY OF THE INVENTION

It is an object of the present invention to provide a kit for constructing a hard tag with article surveillance capabilities.

It is another object of the present invention to provide a kit of the type as described above wherein the hard tag can be easily modified at the initiative of the user to additionally provide product identification capabilities.

It is yet another object of the present invention to provide a kit of the type as described above which facilitates the integration of hard tags with both article surveillance and product identification capabilities into a retail environment.

It is still another object of the present invention to provide a kit as described above which has a limited number of parts, is inexpensive to manufacture and is easy to use. According to one aspect of the invention, there is provided a security kit for an article of merchandise, the security kit comprising (a) a tag body, (b) a first tack adapted to be removably attached to the tag body to form a first reusable hard tag that is limited to electronic article surveillance (EAS) capabilities, and (c) a second tack adapted to be removably attached to the tag body to form a second reusable hard tag that is provided with both electronic article surveillance (EAS) and radio frequency identification (RFID) capabilities.

According to another aspect of the invention, there is provided a security hard tag adapted for removable attachment to an article of merchandise, the security hard tag comprising (a) a tag body, the tag body comprising a security inlay that includes an antenna, and (b) a tack adapted to be removably attached to the tag body to form a reusable hard tag, the tack comprising an integrated circuit (IC) chip, (c) wherein, with the tack attached to the tag body, the IC chip in the tack is coupled to the antenna in the tag body to provide the hard tag with radio frequency identification (RFID) capabilities.

Additional objects, as well as features and advantages, of the present invention will be set forth in part in the description which follows, and in part will be obvious from the description or may be learned by practice of the invention. In the description, reference is made to the accompanying drawings which form a part thereof and in which is shown by way of illustration various embodiments for practicing the invention. The embodiments will be described in sufficient detail to enable those skilled in the art to, practice the invention, and it is to be understood that other embodiments may be utilized and that structural changes may be made without departing from the scope of the invention. The following detailed description is, therefore, not to be taken in a limiting sense, and the scope of the present invention is best defined by the appended claims.

BRIEF DESCRIPTION OF THE DRAWINGS

The accompanying drawings, which are hereby incorporated into and constitute a part of this specification, illustrate the preferred embodiments of the invention and, together with the description, serve to explain the principles of the invention. In the drawings wherein like reference numerals represent like parts:

FIG. 9 is an exploded top perspective view of a second embodiment of a merchandise security kit constructed according to the teachings of the present invention;

FIG. 10 is a top perspective view of a hard tag with article surveillance capabilities, the hard tag being constructed using selected components from the kit shown in FIG. 9;

FIG. 11 is a top perspective view of a hard tag with both article surveillance and product identification capabilities, the hard tag being constructed using selected components from the kit shown in FIG. 9;

FIG. 13 is a top perspective view of the security inlay shown in FIG. 12;

DETAILED DESCRIPTION OF THE PREFERRED EMBODIMENTS

Merchandise Security Kit 11

Figure 1:
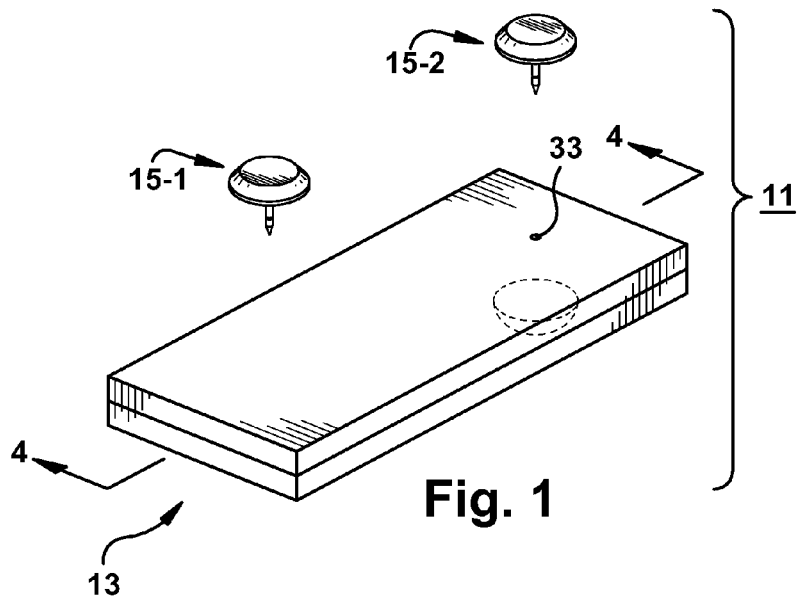
FIG. 1 is a top perspective view of a first embodiment of a merchandise security kit constructed according to the teachings of the present invention.

Referring now to FIG. 1, there is shown a top perspective view of a first embodiment of a security kit for an article of merchandise, the security kit being constructed according to the teachings of the present invention and identified generally by reference numeral 11.

Merchandise security kit 11 comprises a tag body 13, a first tack 15-1 and a second tack 15-2. As will be described in detail below, each tack 15 is designed to penetrate through an article of merchandise (e.g., an article of clothing) and into lockable engagement with hard tag body 13 to create a reusable security tag (also referred to herein as a hard tag) for the article. However, it is to be understood that the particular properties of the hard tag created using kit 11 is dependent upon which of tacks 15-1 and 15-2 is utilized in conjunction with tag body 13.

Figure 2:
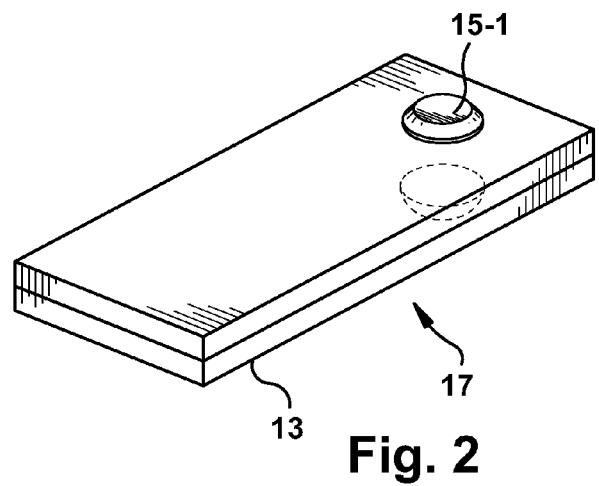
FIG. 2 is a top perspective view of a hard tag with article surveillance capabilities, the hard tag being constructed using selected components from the kit shown in FIG. 1.
Figure 3:
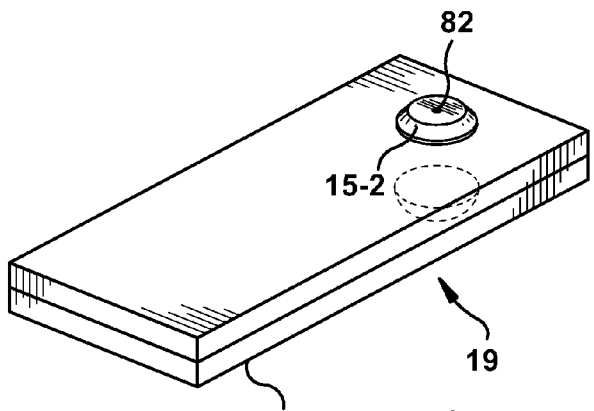
FIG. 3 is a top perspective view of a hard tag with both article surveillance and product identification capabilities, the hard tag being constructed using selected components from the kit shown in FIG. 1.

Specifically, as seen in FIG. 2, tag body 13 and first tack 15-1 can be used together to form a first hard tag 17 that is equipped with electronic article surveillance (EAS) capabilities only. By contrast, as seen in FIG. 3, tag body 13 and second tack 15-2 can be used together to form a second hard tag 19 that is equipped with both electronic article surveillance (EAS) and radio frequency identification (RFID) capabilities. In this manner, kit 11 affords a customer (e.g., a retailer) with the flexibility to enhance a relatively low-cost, electronic article surveillance hard tag (i.e., hard tag 17) with RFID capabilities by simply swapping tack 15-1 with an RFID enabling tack 15-2, as will be discussed further in detail below.

Figure 4:
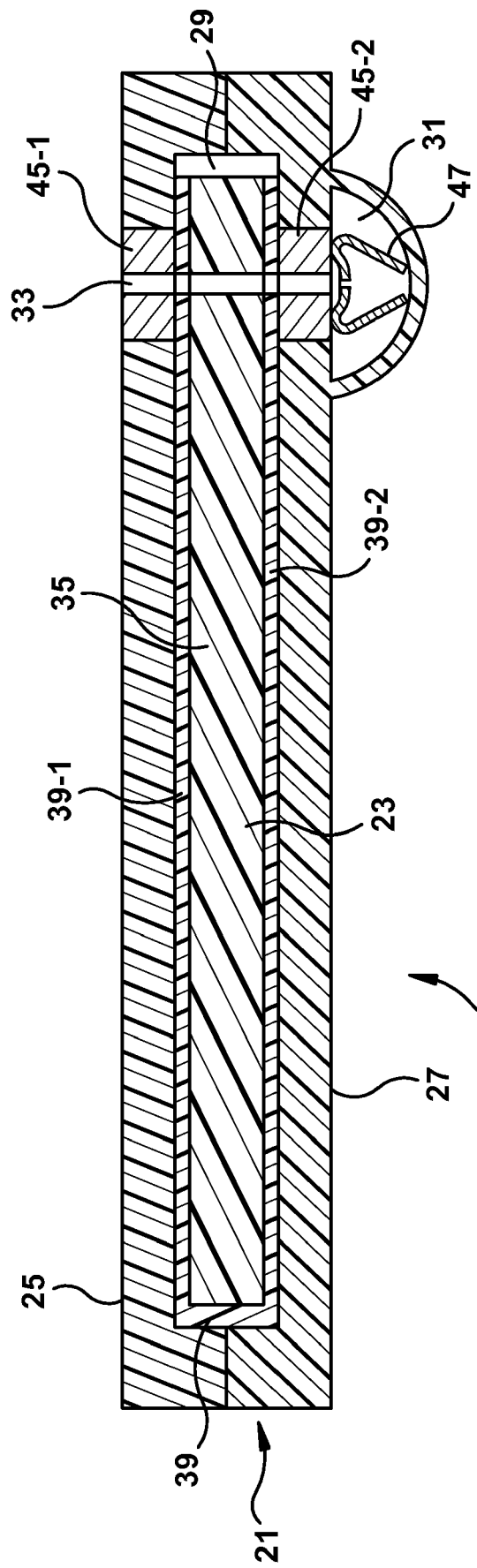
FIG. 4 is a section view of the tag body shown in FIG. 1, taken along lines 4-4.

Referring now to FIG. 4, tag body 13 comprises a rigid plastic casing, or housing, 21 into which is disposed a security inlay 23, the function of which is to be described in detail below.

Casing 21 serves as an outer protective shell for the relatively sensitive security inlay 23 disposed therewithin. Casing 21 is represented herein as comprising an upper body member 25 and a lower body member 27 that are permanently joined together (e.g., through ultrasonic welding or the like) and which together define a substantially enclosed interior cavity 29. As can be seen, lower body member 27 is shaped to define an additional enclosure, or cavity, 31 in which is disposed a mechanism for releasably retaining the sharpened tip of either tack 15, as will be described further in detail below. As can be seen, interior cavity 29 is rendered externally accessible through a pin receptacle, or bore, 33 which extends vertically through upper body member 25, through security inlay 23, through a portion of lower body member 27 and into communication with enclosure 31. Bore 33 is generally circular in transverse cross-section and dimensioned to fittingly receive the sharpened pin of either tack 15.

Although bore 33 is represented herein as penetrating through security inlay 23, it should be noted that tag body 13 need not be limited to this particular construction. Rather, it is to be understood that security inlay 23 could be alternatively dimensioned or configured such that bore 33 extends in close relation to, but without actually penetrating, security inlay 23 without departing from the spirit of the present invention.

Figure 5:
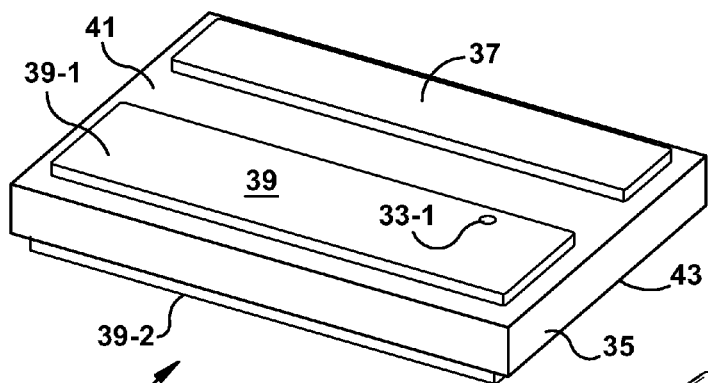
FIG. 5 is a top perspective view of the security inlay shown in FIG. 4.

As noted briefly above, security inlay 23 is disposed within interior cavity 29 and is thereby suitably protected from harmful conditions by outer casing 21. As seen most clearly in FIGS. 4 and 5, security inlay 23 comprises a dielectric substrate, or base, 35, an electronic article surveillance (EAS) marker 37 coupled to base 35 and a radio frequency identification (RFID) antenna 39 coupled to base 35. As noted above, pin receptacle 33 in casing 21 extends through security inlay 23, the segment of bore 33 extending through inlay 23 being represented herein as passing through RFID antenna 39 and base 35 and identified generally by reference numeral 33-1.

Dielectric base 35 is represented herein as being in the form of a thin, plastic card that includes a flat top surface 41 and a flat bottom surface 43.

EAS marker 37 is securely affixed to top surface 41 of base 35 along one of its sides (e.g., using an adhesive-backed EAS marker). EAS marker 37 is preferably in the form of a radio frequency (RF) EAS sensor (e.g., of the type disclosed in U.S. Pat. Nos. 4,429,302 and 4,356,477, both of which are incorporated herein by reference). However, it is to be understood that EAS marker 37 could be in the form of alternative types of EAS sensors without departing from the spirit of the present invention. For example, EAS marker 37 may alternatively be in the form of either (i) an acoustically resonant magnetic sensor of the type disclosed in U.S. Pat. Nos. 4,510,489 and 4,510,490, both of which are incorporated herein by reference, or (ii) a magnetic EAS sensor of the type disclosed in U.S. Pat. Nos. 4,686,516 and 4,797,658, both of which are incorporated herein by reference.

RFID antenna 39 is preferably in the form of a thin, conductive layer, or film, (e.g., a metallic foil) that is secured to substrate 35 by any suitable means. For example, RFID antenna 39 may be coupled to substrate 35 by either (i) embedding sharpened edges of the conductive foil directly into a surface of substrate 35, or (ii) applying a thin foil layer onto a surface of substrate 35 and then, in a subsequent step, etching or cutting away portions of said foil to create the desired antenna pattern. Although antenna 39 is represented herein as being in the form of an RFID-type antenna, it is to be understood that antenna 39 could be in the form of alternative types of antennae (e.g., an EAS-type antenna or a combination EAS/RFID-type antenna) without departing from the spirit of the present invention.

RFID antenna 39 is shown herein as wrapping around three surfaces of substrate 35, with a first portion 39-1 of antenna 39 disposed against top surface 41 and a second portion 39-2 disposed against bottom surface 43. Furthermore, a pair of metallic rings 45-1 and 45-2 is embedded within upper body member 25 and lower body member 27, respectively, each ring 45 immediately defining a portion of pin receptacle 33. As can be seen most clearly in FIG. 4, each of rings 45-1 and 45-2 is positioned to directly contact corresponding portions 39-1 and 39-2, respectively, of RFID antenna 39. In this manner, rings 45 serve as contact points for mechanically (i.e., conductively) coupling RFID enabling tack 15-2 with RFID antenna 39, as will be described further below.

Figure 6:
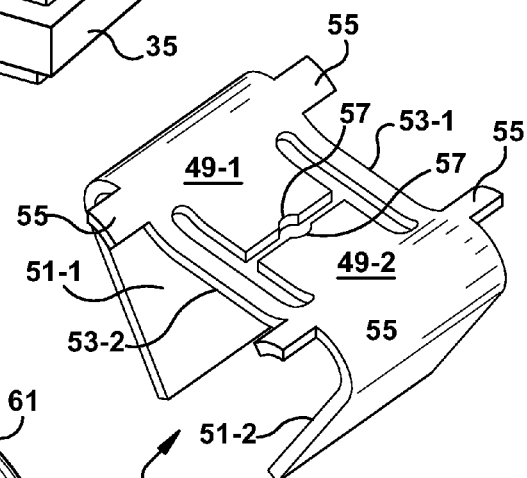
FIG. 6 is a top perspective view of the spring clamp shown in FIG. 4.

Referring now to FIGS. 4 and 6, a spring clamp 47 for releasably retaining the sharpened tip of a tack 15 is disposed within cavity 31 in lower body member 27. As seen most clearly in FIG. 6, spring clamp 47 is a unitary member constructed of a strong, yet flexible, material, such as steel. Spring clamp 47 comprises a pair of opposing, slightly arcuate, engagement fingers 49-1 and 49-2 that are arranged in a generally horizontal configuration, the opposing fingers 49 being naturally biased such that their free ends are spaced slightly apart from one another. The opposite ends of fingers 49-1 and 49-2 are connected to a pair of downwardly extending, planar wings 51-1 and 51-2, respectively.

A pair of rigid, support ribs 53-1 and 53-2 extends horizontally between wings 51 along opposite sides of fingers 49 in order to provide clamp 47 with the requisite structural integrity. In addition, outwardly projecting tabs 55 are formed at opposite ends of ribs 53 and serve as means for fixedly mounting clamp 47 within lower body member 27.

In use, spring clamp 47 is designed to releasably retain the sharpened tip of a tack 15. Specifically, the free end of each finger 49 is provided with an arcuate cut-out 57 that is dimensioned to receive a notch formed in the pin of tack 15. In this manner, fingers 49 engage the pin and thereby preclude rearward withdrawal of tack 15. However, the application of an outward (i.e., pulling) force on each planar wing 51 (e.g., either mechanically or magnetically) in turn causes the free ends of fingers 49 to pivot slightly apart from one another to the extent necessary so that tack 15 is disengaged from fingers 49. With clamp 47 retained as such, tack 15 can be removed from hard tag body 13.

It should be noted that tag body 13 is not limited to the use of spring clamp 47 for retaining a tack 15 secured to tag body 13. Rather, it is to be understood that alternative types of mechanical and/or magnetic clamps could be used in place of clamp 47 to retain tack 15 secured to tag body 13 without departing from the spirit of the present invention.

Figure 7:
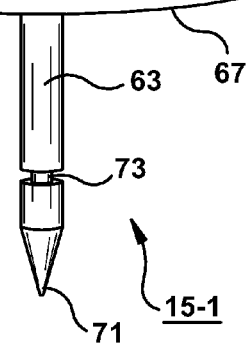
FIGS. 7(a) and 7(b) are enlarged front plan and transverse section views, respectively, of the standard tack shown in FIG. 1.
Figure 7:
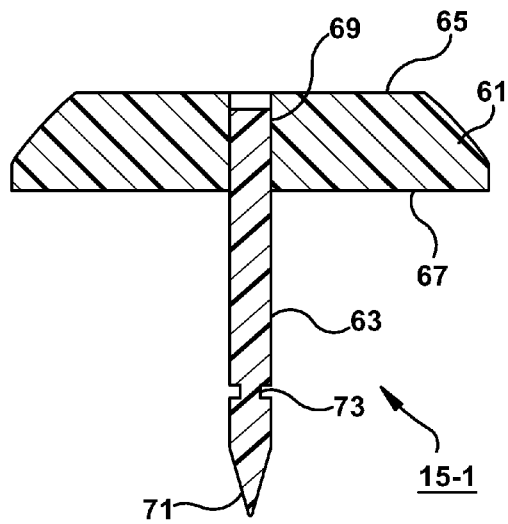

Referring now to FIGS. 7(a) and 7(b), there are shown enlarged front plan and transverse section views, respectively, of tack 15-1. As can be seen, tack 15-1 comprises an enlarged head 61 and a penetrating pin 63, the pin 63 being fixedly connected at one end to head 61.

Enlarged head 61 has a button-shaped design and includes a flattened top surface 65 and a flattened bottom surface 67. Preferably, head 61 is constructed of a rigid plastic material using conventional molding techniques.

Pin 63 is represented herein as an elongated, cylindrical member that is preferably constructed of a rigid metallic material. As can be seen, pin 63 includes a first end 69 that is securely embedded within enlarged head 61 and a second end 71 that is in the form of a sharpened tip. An annular notch 73 is formed into pin 63 proximate second end 71 and, as noted above, serves as a point of engagement with spring clamp 47. Although pin 63 is represented herein as comprising a single annular notch 73, it is to be understood that pin 63 could be alternatively constructed to include additional annular notches 73 along its length to more comfortably accommodate different thicknesses of fabric.

In use, tack 15-1 can be used in combination with tag body 13 to create a reusable hard tag 17 that supports EAS-type article monitoring. Specifically, second end 71 of tack 15-1 is adapted to penetrate through an article of merchandise (e.g., clothing) and in turn fittingly insert into bore 33 in tag body 13 to yield hard tag 17 (as shown in FIG. 2), spring clamp 37 engaging notch 73 in pin 63 to prevent unauthorized separation of tack 15-1 from tag body 13. Because tack 15-1 cooperates with tag body 13 to provide hard tag 17 with basic, or standard, EAS capabilities, tack 15-1 is hereinafter referred to simply as "standard" tack 15-1.

It is to be understood that neither tag body 13 nor standard tack 15-1 is equipped with an integrated circuit (IC) chip for an RFID device. As a result, although tag body 13 includes an RFID antenna 39, without the complementary IC chip, the resultant tag is incapable of operating as a functional RFID device. Rather, as noted above, to create a hard tag with both EAS and RFID capabilities, RFID-enabling tack 15-2 is used with tag body 13 in place of standard tack 15-1.

Figure 8:
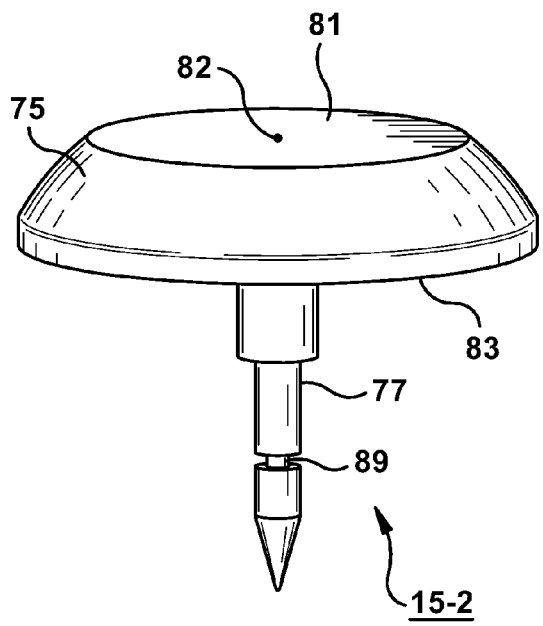
FIGS. 8(a) and 8(b) are enlarged front plan and transverse section views, respectively, of the smart tack shown in FIG. 1.
Figure 8:
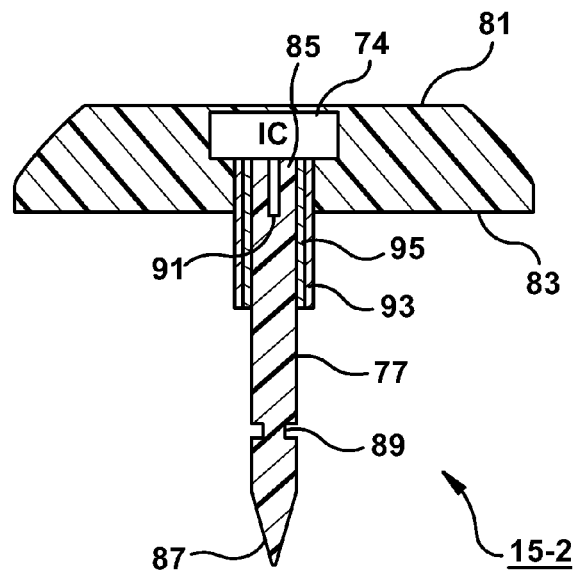

Referring now to FIGS. 8(a) and 8(b), there are shown enlarged front plan and transverse section views, respectively, of RFID-enabling tack 15-1. As can be seen, tack 15-2 is similar to standard tack 15-1 in that tack 15-2 comprises an enlarged head 75 and a penetrating pin 77, pin 77 being fixedly connected at one end to head 75. Tack 15-2 differs from standard tack 15-1 in that tack 15-2 additionally includes an RFID integrated circuit (IC) chip 79 embedded in head 75, as seen most clearly in FIG. 8(b).

Enlarged head 75 is similar to head 61 in that head 75 has a button-shaped design and includes a flat top surface 81 and a substantially flattened bottom surface 83. Preferably, head 75 is similarly constructed of a rigid plastic material using conventional molding techniques. It is to be understood that top surface 65 of head 61 is shown herein as flattened in order to facilitate, among other things, (i) automated handling of tack 15-2, (ii) programming data onto RFID chip 79, and/or (iii) the application of a circular label thereon, the label identifying the information programmed onto RFID chip 79 to ensure that tack 15-2 is coupled to the proper article of commerce.

Pin 77 is also similar to pin 63 in that pin 77 is formed as an elongated, cylindrical member that is preferably constructed of a rigid metallic material. Pin 77 similarly includes a first end 85 that is securely embedded within enlarged head 75 and a second end 87 that is in the form of a sharpened tip. An annular notch 89 is also formed into pin 77 proximate second end 87 and, as noted above, serves as a point of engagement with spring clamp 47.

As noted above, tack 15-2 differs from tack 15-1 in that tack 15-2 is provided with an IC chip 79 which, when coupled to RFID antenna 39 in tag body 13, provides the resultant hard tag 19 with RFID capabilities, which is highly desirable. As seen most clearly in FIG. 8(b), IC chip 79 is preferably embedded within plastic head 75, thereby protecting the relatively sensitive chip 79 from any potentially harmful conditions. To help distinguish tack 15-2 from standard tack 15-1, tack 15-2 is preferably provided with a simple marking 82, such as a dot, on top surface 81, as seen most clearly in FIGS. 3 and 8(a).

IC chip 79 is preferably in the form of a class 1 Gen 2 integrated circuit chip (i.e., having a memory capacity of 96 to 256 bits and unlimited read/write capabilities). However, it is to be understood that IC chip 79 could be replaced with other types of IC chips that are commonly used in RFID applications (e.g., class 0 or class 1 IC chips) without departing from the spirit of the present invention.

A first contact, or lead, 91 is connected to IC chip 79 and extends longitudinally within pin 77. In this manner, pin 77 is conductively coupled to IC chip 79 through contact 91. A second contact 93 is connected to IC chip 79 and extends longitudinally around the outer surface of pin 77. Second contact 93 is annular in design and wraps around the outer surface of pin 77 along a portion of the length (i.e., from first end 85 to the approximate midpoint of pin 77). Second contact 93 is insulated from pin 77 by a thin, dielectric layer 95 disposed therebetween.

In use, tack 15-2 can be used in combination with tag body 13 to create a reusable hard tag 19 that supports both EAS-type article monitoring and RFID-type product identification. Specifically, second end 87 of tack 15-2 is adapted to penetrate through an article of merchandise (e.g., clothing) and in turn fittingly insert into bore 33 in tag body 13 to yield hard tag 19 (as shown in FIG. 3). It should be noted that tack 15-2 is advanced until bottom surface 83 abuts against upper body member 25, with spring clamp 37 engaging notch 89 in pin 77 to prevent unauthorized separation of tack 15-2 from tag body 13.

With tack 15-2 properly inserted into bore 33, pin 77 is drawn into direct contact with metallic ring 45-2 in lower body member 27, thereby establishing a conductive path between lead 91 for IC chip 79 with portion 39-2 of RFID antenna 39 disposed in direct contact with ring 45-2. Similarly, with tack 15-2 properly inserted into bore 33, second contact 93 on tack 15-2 is drawn into direct contact with metallic ring 45-1 in upper body member 25, thereby establishing a conductive path between contact 93 for IC chip 79 with portion 39-1 of RFID antenna 39 disposed in direct contact with ring 45-1.

In this capacity, by simply disposing tack 15-2 into body 13, IC chip 79 is conductively coupled to RFID antenna 39 in tag body 13, thereby activating the RFID capabilities for hard tag 19. Because tack 15-2 is equipped with IC chip 79 and is used as a trigger, or switch, for activating the RFID capabilities for hard tag 19, tack 15-2 is hereinafter referred to simply as "smart" tack 15-2.

Advantages Associated with Kit 11

The particular design of the various components of kit 11 provides a customer with a number of notable advantages over other forms of merchandise security devices which are well known in the art.

As a first advantage, the design of a relatively low cost tag body 13 that can be configured to provide either (i) EAS only or (ii) combination EAS and RFID capabilities affords a customer with an simple and inexpensive means for integrating RFID technology into preexisting EAS security systems.

Specifically, if a customer is not adequately equipped with a system of RFID readers and/or writers, the customer can opt to combine a supply of universal tag bodies 13 with standard tacks 15-1 to create EAS only hard tags 19. In this capacity, the customer would be able to utilize the supply of hard tags 19 in conjunction with common electronic article surveillance systems. Because the only RFID component included in hard tag 19 is the relatively inexpensive RFID antenna 39, the cost of manufacture associated with hard tag 19 is comparable with conventional EAS hard tags, which is highly desirable.

However, once a customer is adequately equipped with a system of RFID readers and/or writers, the customer can create a supply of RFID-enabled hard tags 21 by simply swapping standard tacks 15-1 with smart tacks 15-2. As a result, the customer can delay making the financial commitment associated with purchasing a supply of RFID-enabled security tags (i.e., by purchasing and programming a supply of smart tacks 15-2) until the customer has an RFID system in place. In this capacity, it is to be understood that kit 11 facilitates the integration of hard tags with both article surveillance and product identification capabilities into retail environments, which is a principal object of the present invention. As a second advantage, by incorporating IC chip 79 into the relatively small smart tack 15-2 rather than substantially larger tag body 13, only the supply of smart tacks 15-2 requires routing to the particular service bureau where the data programming is to take place. The substantially larger tag bodies 13 can be directly transported in bulk to the site where each hard tag is to be attached to a corresponding article of merchandise (e.g., a factory or retail store), thereby resulting in a substantial reduction in shipping costs, which is highly desirable.

As a third advantage, the utilization of smart tacks 15-2 to create RFID enabled hard tags promotes a novel, single site process in which a smart tack 15-2 is both (i) programmed with data relating to the intended article to which hard tag 21 is to be secured (e.g., a unique identification code or visually perceptive information relating to the article) and (ii) similarly marked with corresponding visual information relating to said data (e.g., in the form of a sticker with said information printed thereon). In this manner, the application of a removable informational label, or sticker, on top surface 81 of smart tack 15-2 during the programming process provides selected supply chain participants with a simple manual means of identifying the information encoded on smart tack 15-2 during distribution. If desired, the printed data can be removed from smart tack 15-2 at any point during the retail supply chain by simply removing the printed label.

Alternative Embodiments

As noted in detail above, hard tag 19 relies upon the mechanical coupling of IC chip 79 in smart tack 15-2 with RFID antenna 39 in tag body 13 to create a functional RFID device. However, it is to be understood that alternative means for coupling IC chip 79 in smart tack 15-2 with RFID antenna 39 in tag body 13 could be achieved without departing from the spirit of the present invention.

Specifically, referring now to FIG. 9, there is shown a second embodiment of a security kit for an article of merchandise, the security kit being constructed according to the teachings of the present invention and identified generally by reference numeral 111.

Kit 111 is similar to kit 11 in that kit 111 comprises a universal tag body 113, a standard tack 115-1 (identical in construction with tack 15-1) and a smart tack 115-2, with tag body 113 and standard tack 115-1 combining together to form a hard tag 117 (shown in FIG. 10) equipped with EAS capabilities only and tag body 113 and smart tack 115-2 combining together to form a hard tag 119 (shown in FIG. 11) equipped with both EAS and RFID capabilities. However, as will be described further in detail below, kit 111 differs primarily from kit 11 in that kit 111 (i) relies upon reactive coupling, rather than mechanical coupling, to connect the IC chip in smart tack 115-2 with the RFID antenna disposed in hard tag body 113 and (ii) additionally includes an enhanced smart tack 115-3, the details of which will be described further below.

Figure 12:
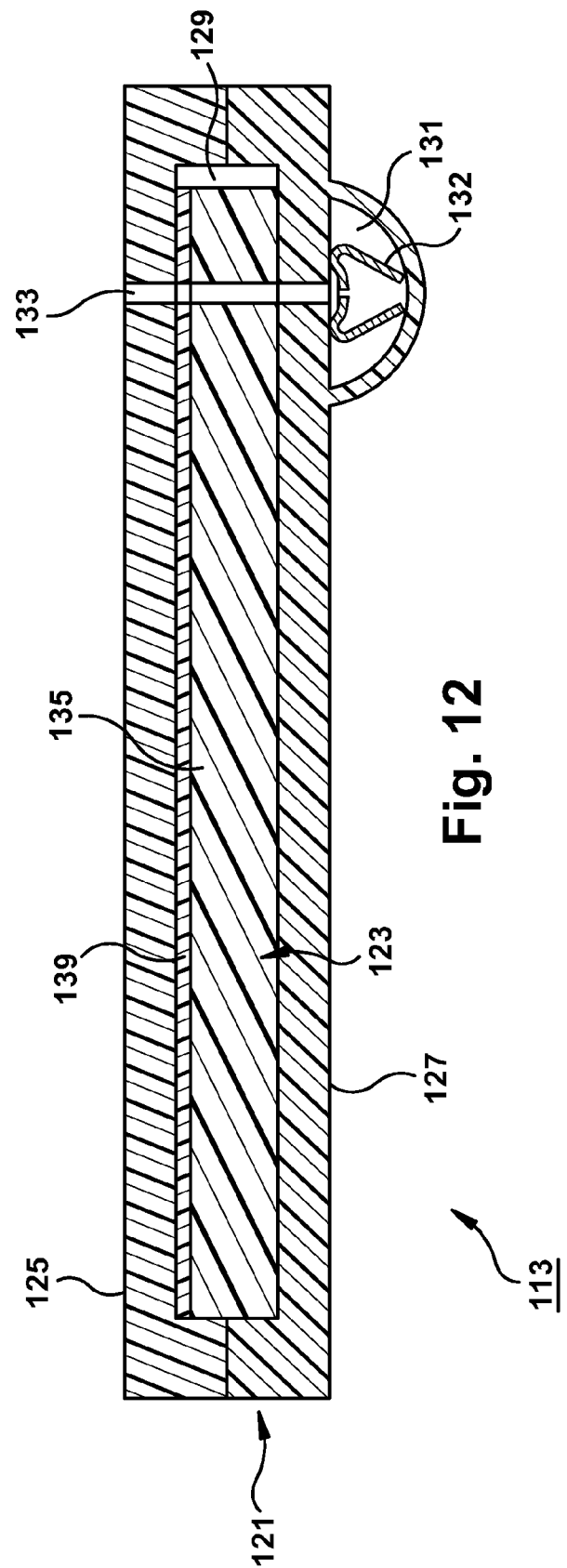
FIG. 12 is a section view of the tag body shown in FIG. 9, take along lines 12-12.

As seen most clearly in FIG. 12, tag body 113 is similar to tag body 13 in that tag body 113 comprises a rigid plastic casing, or housing, 121 into which is disposed an security inlay 123.

Casing 121 is similar to casing 21 in that casing 121 comprises an upper body member 125 and a lower body member 127 that are permanently joined together (e.g., through ultrasonic welding or the like) and which together define a substantially enclosed interior cavity 129. As can be seen, lower body member 127 is shaped to define an additional enclosure, or cavity, 131 in which is disposed a spring clamp 132 or other similar mechanism for releasably retaining the sharpened tip of either tack 115.

Interior cavity 129 is rendered externally accessible through a pin receptacle, or bore, 133 which extends vertically through upper body member 125, through security inlay 123, through a portion of lower body member 127 and into communication with enclosure 131. However, it is to be understood that since kit 111 relies upon reactive coupling to electrically connect smart pin 115-1 to security inlay 123, casing 121 is not required to include metal contacts in either upper body member 125 or lower body member 127 (i.e., contacts similar to rings 47 in tag body 13).

Referring now to FIG. 13, security inlay 123 is similar to inlay 23 in that security inlay 123 comprises a dielectric substrate, or base, 135, an electronic article surveillance (EAS) marker 137 coupled to base 135 and a radio frequency identification (RFID) antenna 139 coupled to base 135.

Dielectric base 135 is similarly represented as a thin, plastic card that includes a flat top surface 141 and a flat bottom surface 143, with EAS marker 137 securely affixed to top surface 141 of base 135 along one of its sides (e.g., using an adhesive-backed EAS marker).

Security inlay 123 differs principally from security inlay 23 in that security inlay 123 includes an RFID antenna 139 that is designed for reactive coupling with smart tack 115-2. Specifically, RFID antenna 139 is shown herein as being in the form of a thin metallic layer (e.g., a very thin aluminum coating or foil, printed conductive ink, such as silver, etc.) disposed on top surface 141 that is punched, etched or otherwise suitably shaped to define a slot 145. As can be seen, slot 145 is configured to create an ultra high frequency (UHF) coupling loop 147 at one end which can be reactively coupled with a corresponding loop element on smart pin 115-1.

Figure 14:
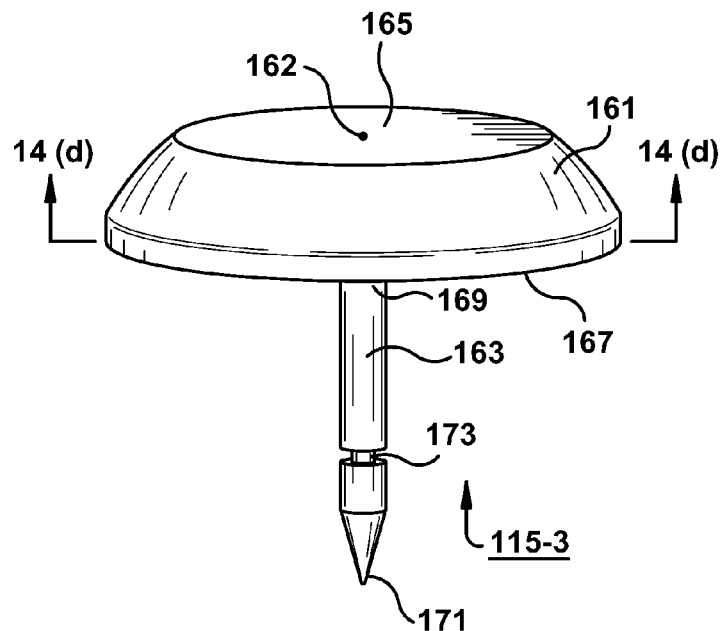
FIG. 14(a) is an enlarged front plan view of the smart tack shown in FIG. 9.
FIG. 14(b) is an enlarged bottom section view of the smart tack shown in FIG. 14(a), taken along lines 14(b)-14(b)
FIG. 14(c) is an enlarged front plan view of the enhanced smart tack shown in FIG. 9.
FIG. 14(d) is an enlarged bottom section view of the enhanced smart tack shown in FIG. 14(c), taken along lines 14(d)-14(d)
Figure 14:
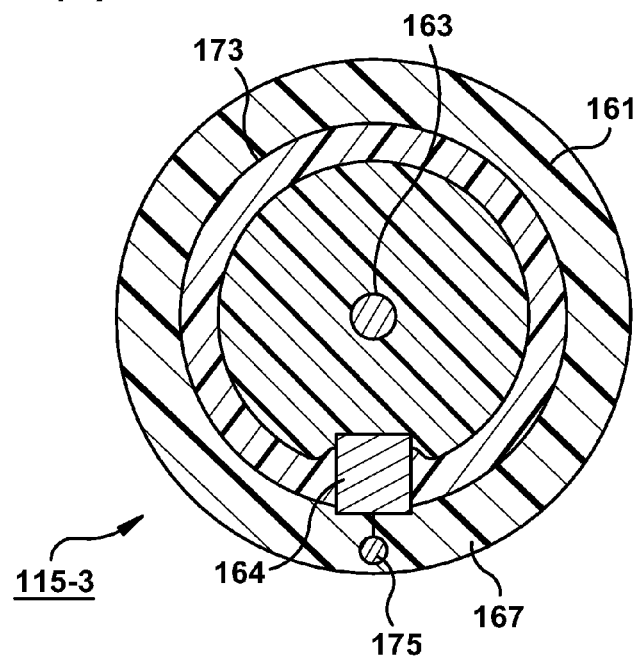

Referring now to FIGS. 14(a) and 14(b), there are shown enlarged front plan and bottom section views, respectively, of RFID-enabling tack 115-2. As can be seen, tack 115-2 is similar to standard tack 15-1 in that tack 115-2 comprises an enlarged head 161 and a penetrating pin 163, pin 163 being fixedly connected at one end to head 161. Tack 115-2 differs from standard tack 15-1 in that tack 115-2 additionally includes an RFID integrated circuit (IC) chip 164 embedded in head 161, as seen most clearly in FIG. 14(b). To help distinguish tack 115-2 from standard tack 115-1, head 161 of tack 115-2 is preferably provided with a simple marking 162, such as a dot, as seen most clearly in FIGS. 11 and 14(a).

Enlarged head 161 is similar to head 61 in that head 161 has a button-shaped design and includes a flat top surface 165 and a substantially flattened bottom surface 167. Preferably, head 161 is constructed of a rigid plastic material using conventional molding techniques. Pin 163 is also similar to pin 63 in that pin 163 is formed as an elongated, cylindrical member that is preferably constructed of a rigid metallic material. Pin 163 similarly includes a first end 169 that is securely embedded within enlarged head 161 and a second end 171 that is in the form of a sharpened tip. An annular notch 173 is also formed into pin 163 proximate second end 171 and, as noted above, serves as a point of engagement with spring clamp 47.

As noted above, smart tack 115-2 differs from standard tacks 15-1 and 115-1 in that smart tack 115-2 is provided with an IC chip 164 that is conductively connected across the free end contacts of a full-wave, UHF, near field, loop antenna 173 embedded within head 161. Accordingly, it is to be understood that with smart tag 115-2 coupled to hard tag 123, near field loop antenna 173 magnetically couples with coupling loop 147 on UHF antenna 139 in hard tag body 113, thereby reactively coupling IC chip 164 with RFID antenna 139, which is highly desirable.

Although IC chip 164 and loop antenna 173 are shown as being embedded within head 161 of smart tack 115-2, it is to be understood that IC chip 164 and loop antenna 173 could be alternatively coupled to head 161 without departing from the spirit of the present invention. Specifically, IC chip 164 and loop antenna 173 could be mounted on an adhesive-backed substrate layer which, in turn, could be affixed to bottom surface 167 of head 161.

Referring now to FIGS. 14(c) and 14(d), there are shown enlarged, front plan and section views, respectively, of enhanced smart tack 115-3. As can be seen, enhanced smart tack 115-3 is identical in construction with smart tack 115-2 with the one notable exception being that enhanced smart tack 115-3 additionally comprises a visible indicator 175 connected to IC chip 164.

Indicator 175 is represented herein as being in the form of a light emitting diode (LED) that is activated by the RFID chip 164. Preferably, head 161 of enhanced smart tack 115-3 is constructed from a clear or translucent plastic material. Accordingly, illumination of indicator 175 by RFID chip 164 causes head 161 of tack 115-3 to glow or flash when commanded by an RFID interrogator.

In this capacity, it is envisioned that enhanced smart tack 115-3 could be used to facilitate locating a particular item within a closed environment. For example, if one were to send out an RF signal for articles of clothing of a particular size, each RFID chip 164 programmed with the desired size information would in turn activate its associated indicator 175, thereby enabling the user to readily identify the target articles, which is highly desirable.

Indicator 175 is preferably powered by RFID chip 164. However, it is to be understood that indicator 175 could be alternatively powered by a small battery or capacitor embedded in head 161, thereby allowing for higher level optical emissions than would be practical by simply rectifying the RF power used to communicate with the RFID device.

It should be noted that enhanced smart tack 115-3 is not limited to the use of an LED for indicator 175. Rather, it is to be understood that alternative types of visual or non-visual indicators (e.g., infra-red indicators that can be identified by a camera or other wide area imaging system) could be used in place thereof without departing from the spirit of the present invention.

It should be noted that hard tag 119 is not limited to the particular pair of coupling antennae shown herein to reactively couple smart tack 115-2 with tag body 113. Rather, alternative pairs of coupling antennae could be utilized in hard tag 119 to reactively couple smart tack 115-2 with tag body 113 without departing from the spirit of the present invention.

Figure 15:
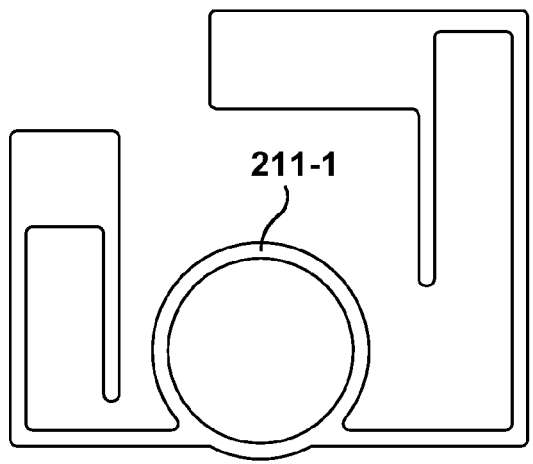
FIGS. 15(a) and 15(b) are top plan views of a first modification to the pair of reactive coupling antennae used in the tag body and smart tack, respectively, of the combination hard tag shown in FIG. 11, the antenna in FIG. 15(b) being shown with an IC chip mounted thereon.
Figure 15:
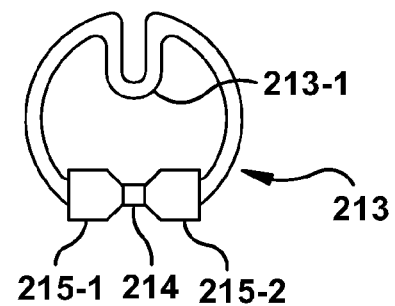

As an example, referring now to FIGS. 15(a) and 15(b), there is shown a first alternative pair of coupling antennae that could be utilized in hard tag 119 in place of complementary antennae 139 and 173. Specifically, the complementary elements include (i) a dipole form antenna 211 (shown in FIG. 15(a)) for tag body 113, antenna 211 comprising a coupling loop 211-1, and (ii) a loop antenna 213 (shown in FIG. 15(b)) for smart tack 115-2, antenna 213 comprising an additional line element 213-1 to increase its overall length/inductance. For greater understanding of the present invention, an IC chip 214 is shown mounted on contact pads 215-1 and 215-2 of loop antenna 213.

Figure 16:
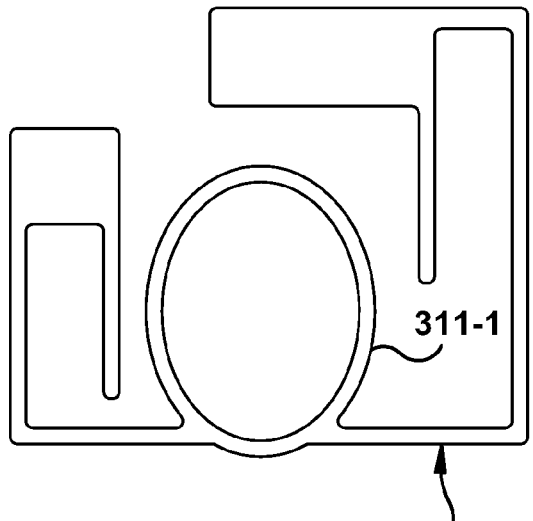
FIGS. 16(a) and 16(b) are top plan views of a second modification to the pair of reactive coupling antennae used in the tag body and smart tack, respectively, of the combination hard tag shown in FIG. 11, the antenna in FIG. 16(b) being shown with an IC chip mounted thereon.
Figure 16:
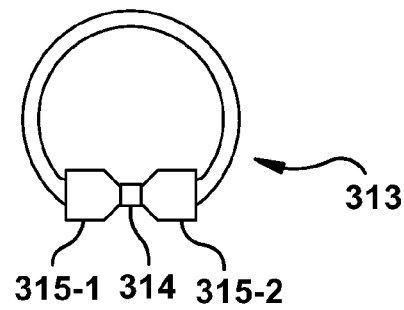

As another example, referring now to FIGS. 16(a) and 16(b), there is shown a second alternative pair of coupling antennae that could be utilized in hard tag 119 in place of complementary antennae 139 and 173. Specifically, the complementary elements include (i) a dipole form antenna 311 (shown in FIG. 16(a)) for tag body 113, antenna 311 comprising an extended coupling loop 311-1, and (ii) a loop antenna 313 (shown in FIG. 16(b)) for smart tack 115-2. For greater understanding of the present invention, an IC chip 314 is shown mounted on contact pads 315-1 and 315-2 of loop antenna 313.

Figure 17:
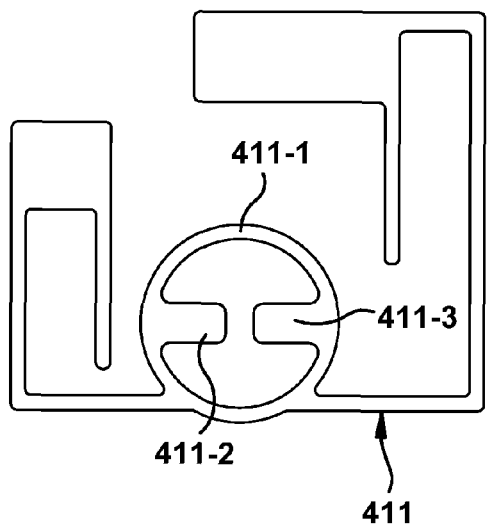
FIGS. 17(a) and 17(b) are top plan views of a third modification to the pair of reactive coupling antennae used in the tag body and smart tack, respectively, of the combination hard tag shown in FIG. 11, the antenna in FIG. 17(b) being shown with an IC chip mounted thereon.
Figure 17:
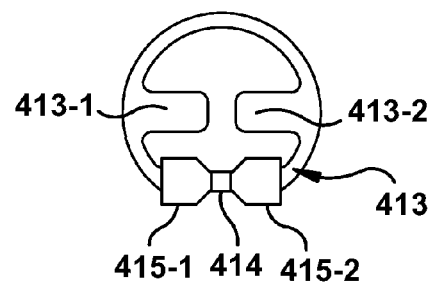

As yet another example, referring now to FIGS. 17(a) and 17(b), there is shown a third alternative pair of coupling antennae that could be utilized in hard tag 119 in place of complementary antennae 139 and 173. Specifically, the complementary elements include (i) a dipole form antenna 411 (shown in FIG. 17(a)) for tag body 113, antenna 411 comprising a coupling loop 411-1 with electric field coupling enhancement tabs 411-2 and 411-3, and (ii) a loop antenna 413 (shown in FIG. 17(b)) for smart tack 115-2, antenna 413 comprising a pair of tabs 413-1 and 413-2 for enhancing electric field coupling with antenna 411. For greater understanding of the present invention, an IC chip 414 is shown mounted on contact pads 415-1 and 415-2 of loop antenna 413.

Figure 18:
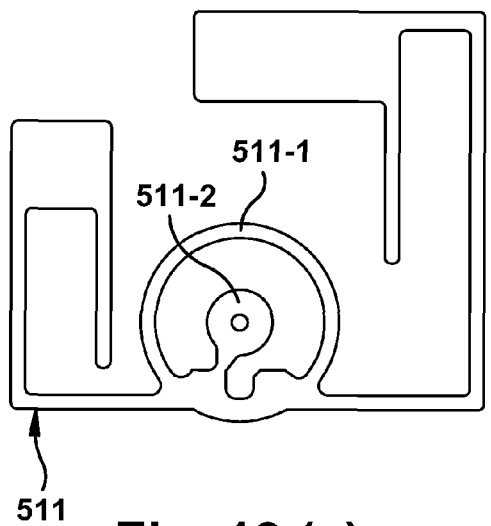
FIGS. 18(a) and 18(b) are top plan views of a first modification to the pair of reactive coupling antennae used in the tag body and smart tack, respectively, of the combination hard tag shown in FIG. 11, the antenna in FIG. 18(b) being shown with an IC chip mounted thereon.
Figure 18:
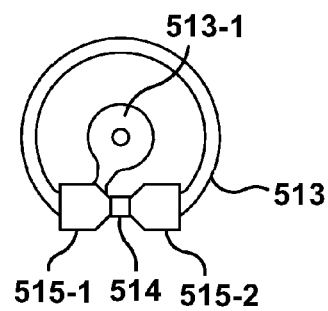

As yet still another example, referring now to FIGS. 18(a) and 18(b), there is shown a fourth alternative pair of coupling antennae that could be utilized in hard tag 119 in place of complementary antennae 139 and 173. Specifically, the complementary elements include (i) a dipole form antenna 511 (shown in FIG. 18(a)) for tag body 113, antenna 511 comprising a coupling loop 511-1 and a pin connection tab 511-2, and (ii) a loop antenna 513 (shown in FIG. 18(b)), antenna 513 comprising a pin connection tab 513-1. For greater understanding of the present invention, an IC chip 514 is shown mounted on contact pads 515-1 and 515-2 of loop antenna 513.

Referring back to FIG. 13, security inlay 123 is represented as comprising an EAS marker 137 and an RFID antenna 139 that are separately constructed and mounted on a common substrate 135. However, it is to be understood that the construction of security inlay 123 could be modified such that a conductive element in EAS marker 137 would serve not only as a component of the EAS marker but also as the RFID antenna for the device. Using an element of the EAS tag conductor structure as the RFID antenna within the hard tag reduces the total number of parts for inlay 123 and greatly simplifies construction, which is highly desirable.

Figure 19:
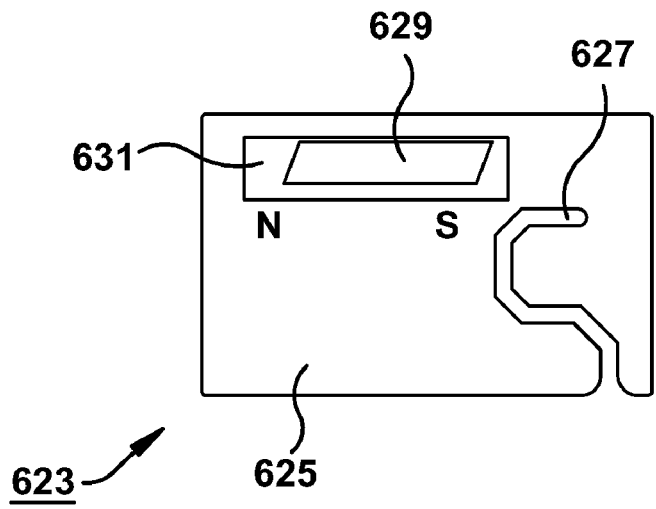
FIG. 19 is a top plan view of a first modification to the security inlay shown in FIG. 13.

Referring now to FIG. 19, there is shown a security inlay constructed according to the teachings of the present invention and identified generally by reference numeral 623. As will be described in detail below, security inlay 623 differs primarily from security inlay 123 in that the EAS and RFID devices in security inlay 623 share a common component.

Specifically, security inlay 623 comprises a layer of magnetic material 625, such as a suitable metal foil or aluminum, which is punched, cut or otherwise formed to define a slot 627. As a result of the inclusion of slot 627, layer of magnetic material 625 can serve as an ultra high frequency (UHF) RFID antenna when resonantly coupled with RFID chip 164 in either of smart tacks 115-2 and 115-3.

To provide security inlay 623 with its EAS capabilities, a magnetostrictive element (e.g., a resonator) 629 is disposed within a cavity 631 punched in magnetic layer 625, with element 629 retained within cavity 631 by applying a cover (not shown), such as a plastic housing member, to layer 625 over cavity 631. Accordingly, with layer 625 suitably magnetized, layer 625 and element 629 function together to form an acoustomagnetic-type EAS marker, which is highly desirable.

It should be noted that if magnetic layer 625 is constructed from a relatively thick sheet of material, (e.g. 0.1 inch thick layer of material), the rigidity of layer 625 eliminates the need for a dielectric substrate, thereby simplifying its manufacture, which is highly desirable. In fact, it is envisioned that if inlay 623 is constructed as such, it would eliminate the need for any outer protective housing. Specifically, with layer 625 coated for aesthetic purposes, the modified inlay 623 could be used in a retail setting as a thin, stylish, "dog tag" type hard tag (i.e., without the need for an unsightly outer plastic casing), which is highly desirable. Optionally, the metal foil is plated with a thin layer of non-magnetic conductor, such as copper, to improve the performance of the layer 625 as an RFID antenna.

In an alternative version of the tag shown in FIG. 19, substrate 625 is formed from a relatively thick sheet of non-magnetic, conductive material, such as aluminum. In this embodiment, EAS marker 629 is a complete device including its own magnet, which is mounted into a depression or thinned area of aluminum substrate 625 and optionally retained by an adhesive label or coating. To enhance the performance of the EAS marker, apertures can be punched in substrate 625 under or adjacent to EAS marker 629. In this 'dog tag' form the aluminum layer can optionally be anodized for aesthetic purposes and punched with additional slots in addition to slot 627 which have decorative functions, such as a logo or a text. In another embodiment, slot 627 itself can be all or part of a logo or other text.

Constructed as such, it is envisioned that a secondary cavity (not shown) could be punched in magnetic layer 625 that is sized and shaped to receive a spring clamp (not shown) or other similar mechanism for releasably retaining a tack, the mechanism being trapped within the secondary cavity by applying a cover (not shown), such as a label, to layer 625 over said secondary cavity.

Figure 20:
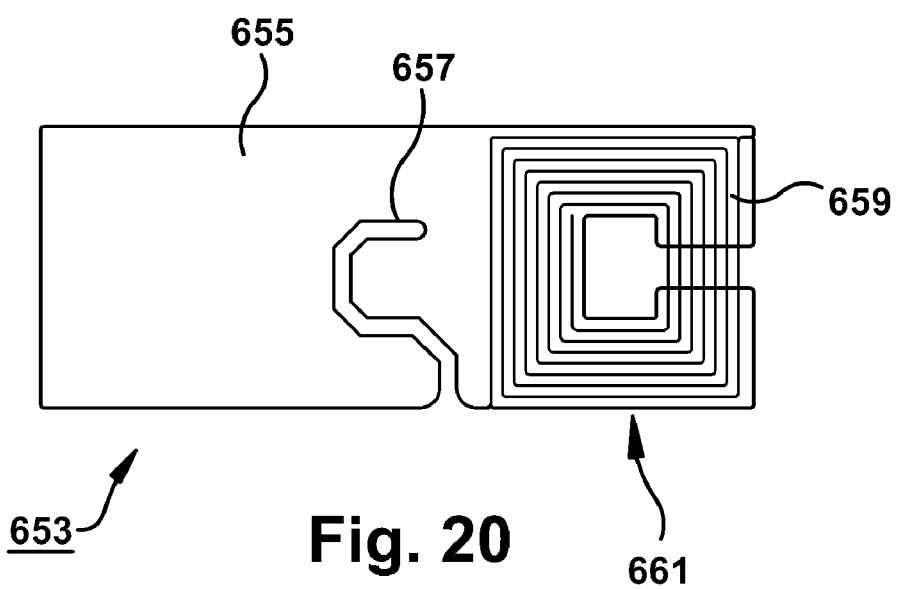
FIG. 20 is a top plan view of a second modification to the security inlay shown in FIG. 13.

Referring now to FIG. 20, there is shown another embodiment of a security inlay constructed according to the teachings of the present invention, the security inlay being identified generally by reference numeral 653. Security inlay 653 is similar to inlay 623 in that inlay 653 comprises a layer of conductive material 655 that is shaped to defined a slot 657 which enables conductive layer 655 to act as a UHF RFID antenna when resonantly coupled with RFID chip 164 in either of smart tacks 115-2 and 115-3. Preferably, layer 655 is constructed from a layer of aluminum.

Security inlay 653 differs from security inlay 623 primarily in that the RFID antenna is formed from an extension of a conductor 659 for an EAS marker 661 which is designed as a resonant circuit at a relatively low frequency, such as approximately 8.2 MHz.

The embodiments of the present invention described above are intended to be merely exemplary and those skilled in the art shall be able to make numerous variations and modifications to it without departing from the spirit of the present invention. All such variations and modifications are intended to be within the scope of the present invention as defined in the appended claims.

What is claimed is:

1. A security hard tag adapted for removable attachment to an article of merchandise, the security hard tag comprising:
   (a) a tag body, the tag body comprising a security inlay that includes an antenna; and
   (b) a tack adapted to be removably attached to the tag body to form a reusable hard tag, the tack comprising an integrated circuit (IC) chip;
   (c) wherein, with the tack attached to the tag body, the IC chip in the tack is coupled to the antenna in the tag body to provide the hard tag with radio frequency identification (RFID) capabilities.

2. The security hard tag of claim 1 wherein, with the tack attached to the tag body, the IC chip in the tack is reactively coupled to the antenna in the tag body.

3. The security hard tag of claim 1 wherein, with the tack attached to the tag body, the IC chip in the tack is conductively coupled to the antenna in the tag body.

4. The security hard tag of claim 1 wherein the security inlay additionally comprises an electronic article surveillance (EAS) marker that is designed to provide the hard tag with electronic article surveillance capabilities.

5. The security hard tag of claim 4 wherein the security inlay additionally comprises a thin, dielectric substrate on which the antenna and the EAS marker are disposed in a spaced apart relationship.

6. The security hard tag of claim 4 wherein the tag body additionally comprises a casing shaped to define an interior cavity, the security inlay being disposed within the interior cavity of the casing.

7. The security hard tag of claim 6 wherein the tag body additionally comprises a mechanism disposed in the casing that is adapted to receive and releasably engage a portion of the tack to retain the tack attached to the tag body.

8. The security hard tag of claim 7 wherein the mechanism in the tag body for receiving and releasably engaging a portion of the tack is in the form of a metallic spring clamp.

9. The security hard tag of claim 2 wherein the tack comprises:
(a) an enlarged head; and
(b) a sharpened pin coupled, at one end, to the enlarged head.

10. The security hard tag of claim 9 wherein the tack additionally comprises a resonant near field antenna to which the IC chip is conductively coupled, the resonant near field antenna magnetically coupling the IC chip in the tack to the antenna in the tag body.

11. The security hard tag of claim 10 wherein the IC chip and the resonant near field antenna are both embedded within the enlarged head in the tack.

12. The security hard tag of claim 11 wherein each of the antennae in the tack and the tag body operate within the ultra high frequency (UHF) range.

13. The security hard tag of claim 11 wherein each of the antenna in the tack and the tag body operate within the High Frequency RFID band (13.56 MHz).

14. The security hard tag of claim 11, wherein the antennae operate in the tag body within the Low Frequency RFID band (8.2 MHz).

15. The security hard tag of claim 1 wherein the tack is provided with a visual indicator.

16. A security kit for an article of merchandise, the security kit comprising:
(a) a tag body;
(b) a first tack adapted to be removably attached to the tag body to form a first reusable tag that is limited to electronic article surveillance (EAS) capabilities; and
(c) a second tack adapted to be removably attached to the tag body to form a second reusable tag that is provided with both electronic article surveillance (EAS) and radio frequency identification (RFID) capabilities.

17. The security kit of claim 16 wherein the tag body comprises:
(a) a RFID antenna; and
(b) an EAS marker.

18. The security kit of claim 17 wherein the second tack comprises an IC chip that, with the second tack attached to the tag body, couples to the antenna in the tag body to provide the second reusable hard tag with its RFID capabilities.

19. The security kit of claim 18 wherein the second tack additionally comprises a resonant near field antenna to which the IC chip is conductively coupled, the resonant near field antenna magnetically coupling the IC chip to the antenna in the tag body.

20. The security kit of claim 19 wherein the second tack comprises:
(a) an enlarged head; and
(b) a sharpened pin coupled, at one end, to the enlarged head.

21. The security kit of claim 20 wherein the IC chip and the resonant near field antenna are both embedded within the enlarged head in the tack.

22. The security kit of claim 19 wherein each of the antennae in the tack and the tag body operates within the ultra high frequency (UHF) range.

23. The security kit of claim 18 wherein the second tack additionally comprises an indicator connected to the IC chip.

24. The security kit of claim 23, wherein the indicator is a visual indicator.

* * * * *